United States Patent
Sung et al.

(10) Patent No.: US 10,090,928 B2
(45) Date of Patent: Oct. 2, 2018

(54) ANALOG OPTICAL TRANSMISSION SYSTEM USING DISPERSION MANAGEMENT TECHNIQUE

(71) Applicant: Electronics and Telecommunications Research Institute, Daejeon-si (KR)

(72) Inventors: Min Kyu Sung, Seoul (KR); Jong Hyun Lee, Daejeon-si (KR); Hwan Seok Chung, Daejeon-si (KR); Seung Hyun Cho, Sejong-si (KR); Chan Gyo Han, Daejeon-si (KR)

(73) Assignee: ELECTRONICS AND TELECOMMUNICATIONS RESEARCH INSTITUTE, Daejeon-si (KR)

( * ) Notice: Subject to any disclaimer, the term of this patent is extended or adjusted under 35 U.S.C. 154(b) by 0 days.

(21) Appl. No.: 15/378,194

(22) Filed: Dec. 14, 2016

(65) Prior Publication Data
US 2017/0250753 A1    Aug. 31, 2017

(30) Foreign Application Priority Data
Feb. 25, 2016 (KR) .................. 10-2016-0022663

(51) Int. Cl.
*H04B 10/00* (2013.01)
*H04B 10/2513* (2013.01)
*H04B 10/2575* (2013.01)

(52) U.S. Cl.
CPC . *H04B 10/25133* (2013.01); *H04B 10/25753* (2013.01)

(58) Field of Classification Search
CPC ....... H04B 10/25133; H04B 10/25753; H04W 88/085
USPC .................... 398/147–150, 194, 199
See application file for complete search history.

(56) References Cited

U.S. PATENT DOCUMENTS

| | | | | |
|---|---|---|---|---|
| 5,877,879 A * | 3/1999 | Naito | ................. | G02B 6/29394 398/81 |
| 6,320,687 B1 * | 11/2001 | Ishikawa | ............ | H04B 10/2519 398/147 |
| 6,570,691 B1 * | 5/2003 | Miyauchi | ................ | H01L 31/14 398/141 |
| 6,594,428 B1 * | 7/2003 | Tanaka | ............. | H04B 10/25253 385/123 |
| 6,925,262 B2 * | 8/2005 | Ooi | .................. | H04B 10/25133 398/147 |

(Continued)

FOREIGN PATENT DOCUMENTS

| KR | 10-0725025 B1 | 6/2007 |
|---|---|---|
| KR | 10-1050885 B1 | 7/2011 |
| KR | 10-2015-0044382 A | 4/2015 |

*Primary Examiner* — Amritbir Sandhu
(74) *Attorney, Agent, or Firm* — Rabin & Berdo, P.C.

(57) ABSTRACT

Provided is an analog optical transmission system using a dispersion management technique. The analog optical transmission system may include a digital unit (DU) pool including a plurality of DUs to transmit an optical signal; a plurality of radio units (RUs) to receive the optical signal; and one or more dispersion management apparatus to remove a signal distortion component caused by an interaction between a chirp and chromatic dispersion by compensating for the chromatic dispersion before the plurality of RUs receives the optical signal that is transmitted from the DU pool.

9 Claims, 5 Drawing Sheets

(56) References Cited

U.S. PATENT DOCUMENTS

| | | | |
|---|---|---|---|
| 7,512,345 B2* | 3/2009 | Yamada | H04B 10/25253 398/147 |
| 9,166,698 B2 | 10/2015 | Bae et al. | |
| 2002/0131711 A1* | 9/2002 | Tanaka | G02B 6/29376 385/39 |
| 2004/0013361 A1 | 1/2004 | Chen et al. | |
| 2004/0096222 A1* | 5/2004 | Cagenius | H04B 10/25755 398/115 |
| 2004/0190906 A1 | 9/2004 | Jain | |
| 2011/0052198 A1* | 3/2011 | Ohtani | H04B 10/25133 398/81 |
| 2013/0216229 A1* | 8/2013 | Cvijetic | H04B 10/25754 398/66 |
| 2014/0003819 A1* | 1/2014 | Cho | H04W 72/04 398/96 |
| 2014/0199074 A1* | 7/2014 | Cho | H04B 10/548 398/79 |
| 2015/0117861 A1* | 4/2015 | Ponzini | H04B 10/2575 398/79 |
| 2015/0222468 A1* | 8/2015 | Li | H04L 27/2628 375/295 |
| 2016/0197698 A1* | 7/2016 | Oxenlowe | H04B 10/675 398/79 |
| 2016/0285553 A1* | 9/2016 | Cho | H04B 10/25759 |
| 2017/0126320 A1* | 5/2017 | Cho | H04B 10/2575 |
| 2017/0250753 A1* | 8/2017 | Sung | H04B 10/25133 |

* cited by examiner

ANALOG OPTICAL TRANSMISSION SYSTEM USING DISPERSION MANAGEMENT TECHNIQUE

CROSS-REFERENCE TO RELATED APPLICATION(S)

This application claims priority from Korean Patent Application No. 10-2016-0022663, filed on Feb. 25, 2016, in the Korean Intellectual Property Office, the entire disclosure of which is incorporated herein by reference for all purposes.

BACKGROUND

1. Field

The following description relates to a centralized radio access network (C-RAN).

2. Description of the Related Art

A centralized radio access network (C-RAN) has a structure, where a digital unit (DU) in charge of digital signal processing of a base station and resource controlling is integrated into one station in the form of a centralized station, and where a radio unit (RU) in charge of a passive function of amplifying a radio wave signal and transmitting it to an antenna is connected remotely to the DU through an optical cable. A trend of a recent high-speed mobile communication network is a C-RAN system, in which a base station is separated in to a DU and an RU, and the DU is changed to cloud. A signal transmission section between the DU and the RU in C-RAN is called a mobile fronthaul, and as a method of transmitting an optical signal in this section, intermediate frequency over fiber (IFoF) analog optical transmission method, which has a simple structure and is cost-effective, is being mentioned as a technical candidate to implement the mobile fronthaul of C-RAN.

SUMMARY

The following description relates to a technical method to reduce the degradation of performance caused by an interaction between a chirp, which occurs in an intermediate frequency over fiber (IFoF)-based analog optical transmission mobile fronthaul link, and chromatic dispersion.

In one general aspect, an analog optical transmission system includes: a digital unit (DU) pool including a plurality of DUs to transmit an optical signal; a plurality of radio units (RUs) to receive the optical signal; and one or more dispersion management apparatus to remove a signal distortion component caused by an interaction between a chirp and chromatic dispersion by compensating for the chromatic dispersion before the plurality of RUs receives the optical signal that is transmitted from the DU pool.

There may be one dispersion management apparatus, which may be positioned after the DU pool and compensate for chromatic dispersion of the optical signal transmitted from the DU pool and then transmit the compensated optical signal to the plurality of RUs over fronthaul links.

There may be a plurality of dispersion management apparatuses, each of which may be positioned before each of the plurality of RUs and compensate for chromatic dispersion of optical signals transmitted over fronthaul links and then transmit the compensated optical signals to the plurality of RUs corresponding one-to-one to each of the plurality of dispersion management apparatuses.

There may be a plurality of dispersion management apparatuses, which may be positioned before one RU or two or more RUs and compensate for chromatic dispersion of optical signals transmitted over fronthaul links and then transmit the compensated optical signals to the one RU or two or more RUs corresponding to each of the plurality of dispersion management apparatuses. Here, the two or more RUs corresponding to one dispersion management apparatus may be positioned in a predetermined close distance to each other.

There may be a plurality of dispersion management apparatuses, including: one pre-dispersion management apparatus, which may be positioned after the DU pool and compensate for chromatic dispersion of the optical signal transmitted from the DU pool and then transmit the compensated optical signal to the plurality of RUs over fronthaul links; and a plurality of post-dispersion management apparatuses, which may be positioned before each of the plurality of RUs and compensate for chromatic dispersion of optical signals transmitted over fronthaul links from the pre-dispersion management apparatus and then transmit the compensated optical signals to the plurality of RUs corresponding one-to-one to each of the plurality of post-dispersion management apparatuses.

There may be a plurality of dispersion management apparatuses, including: one pre-dispersion management apparatus, which may be positioned after the DU pool and compensate for chromatic dispersion of the optical signal transmitted from the DU pool and then transmit the compensated optical signal to the plurality of RUs over fronthaul links; and a plurality of post-dispersion management apparatuses, which may be positioned before one RU or two or more RUs and compensate for chromatic dispersion of optical signals transmitted over fronthaul links from the pre-dispersion management apparatus and then transmit the compensated optical signals to one RU or two or more RUs corresponding to each of the plurality of post-dispersion management apparatuses. Here, the two or more RUs corresponding to one dispersion management apparatus may be positioned in a predetermined close distance to each other.

The dispersion management apparatus may be a tunable dispersion compensation module (TDCM).

The dispersion management apparatus may perform first compensation by using a TDCM, and second compensation by using a fixed dispersion compensation module (FDCM).

Other features and aspects may be apparent from the following detailed description, the drawings, and the claims.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following description is provided to assist the reader in gaining a comprehensive understanding of the methods, apparatuses, and/or systems described herein. Accordingly, various changes, modifications, and equivalents of the methods, apparatuses, and/or systems described herein will be suggested to those of ordinary skill in the art. Also, descriptions of well-known functions and constructions may be omitted for increased clarity and conciseness.

Figure 1:
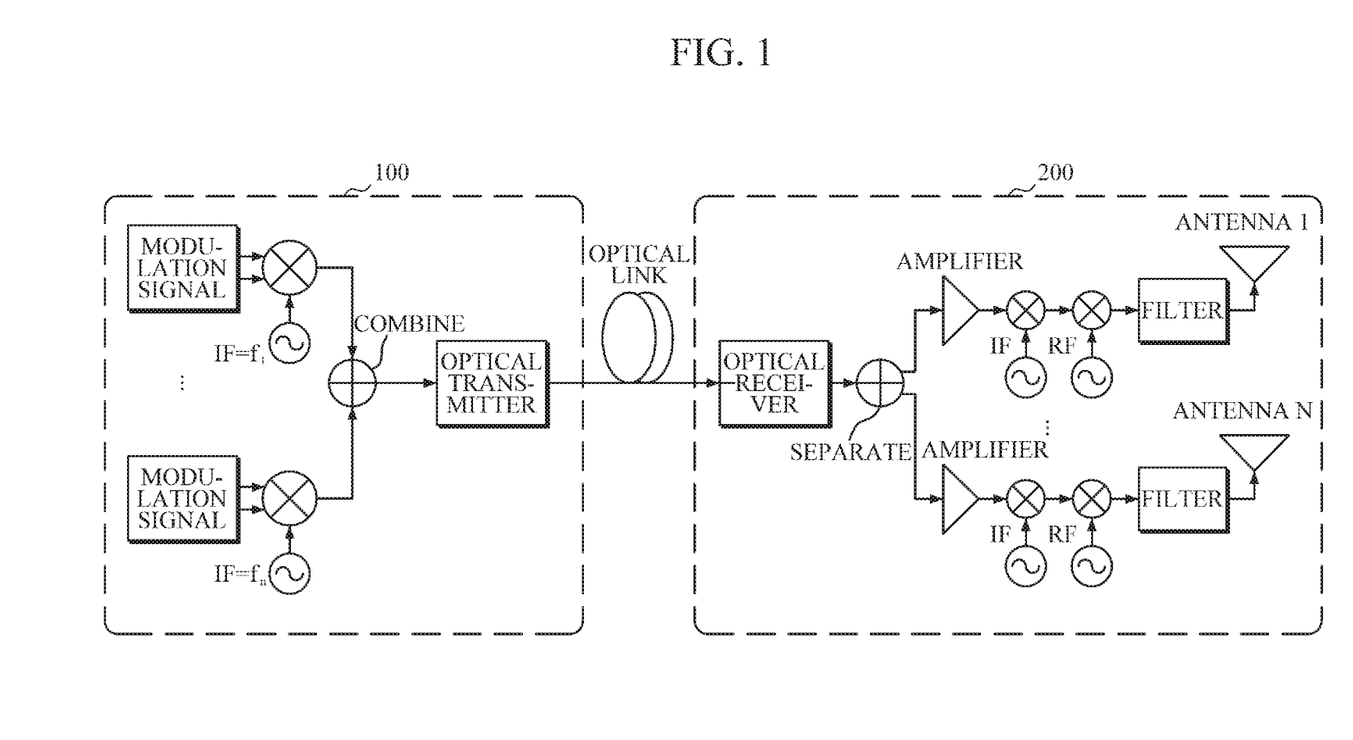
FIG. 1 is a diagram illustrating an analog optical transmission system by using a dispersion management technique.

FIG. 1 is a diagram illustrating an analog optical transmission system by using a dispersion management technique. A digital unit (DU) loads several digital baseband modulation signal on an arbitrary intermediate frequency (IF) carrier. The several IF carriers are combined by a coupler, and are multiplexed in a frequency domain. The generated multiplexed electronic signal is converted to an optical signal at an optical transmitter, and the optical signal is transmitted over an optical link. An optical receiver of a radio unit (RU) 200 receives an optical signal over an optical link and converts the optical signal to an electronic signal, which is then separated by a splitter and transmitted to an antenna through an amplifier, a filter, etc.

When the optical transmitter converts an electronic signal to an optical signal, a phenomenon called a chirp occurs in a laser. The chirp interacts with a chromatic dispersion in an optical link and causes a phase shift, which is converted to an intensity signal in a process of square-law detection in a RU 200 that is a reception end. The intensity signal is a non-linear signal distortion factor, and decreases a signal-to-noise ratio of a system. As such, since a process, in which the non-linear signal distortion factor is generated, is a linear phenomenon, the non-linear signal distortion factor may be significantly decreased if the chromatic dispersion is compensated before the square-law detection.

Figure 2:
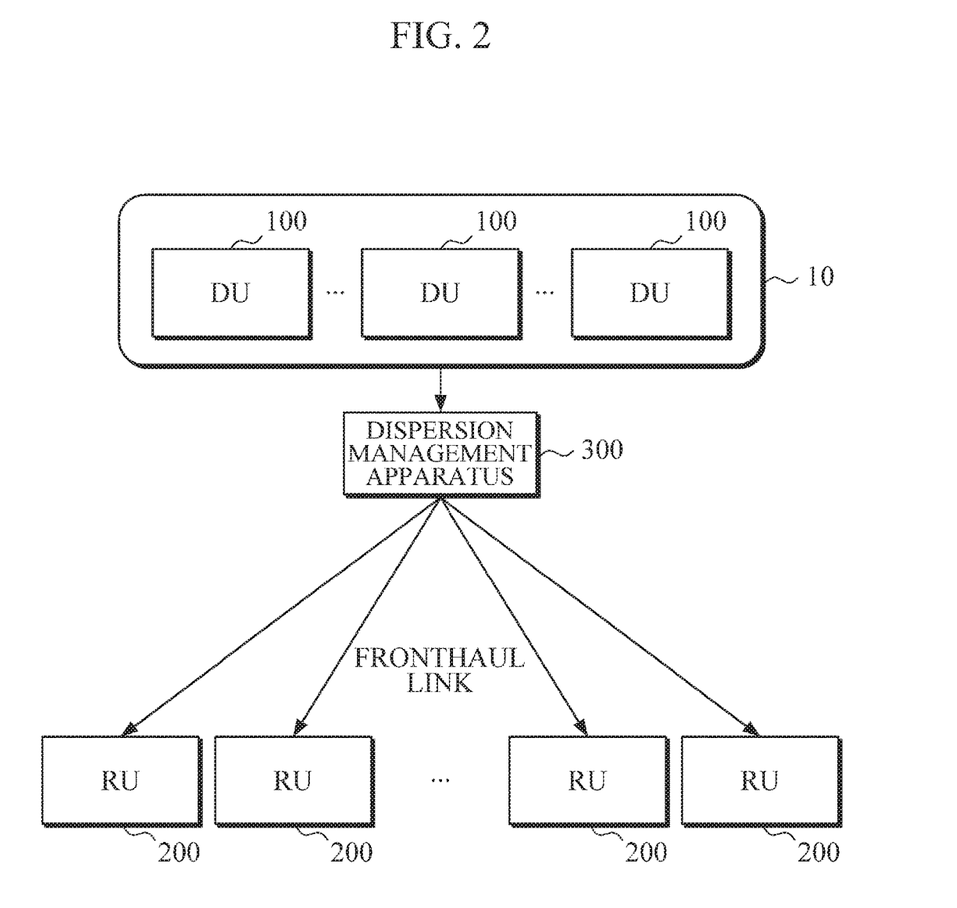
FIG. 2 is a diagram illustrating a mobile fronthaul based on a pre-dispersion management apparatus according to an exemplary embodiment.

FIG. 2 is a diagram illustrating a mobile fronthaul based on a pre-dispersion management apparatus according to an exemplary embodiment. In a C-RAN system, a plurality of DUs 100 is configured as one DU pool 10. Each of the DUs 100 generates and transmits an optical signal as described above, and RUs receive the optical signals over mobile fronthaul links. A dispersion management apparatus 300 is the component to remove a non-linear signal distortion factor. As illustrated in FIG. 2, the dispersion management apparatus 300 is positioned after the DU pool 10. This configuration is called a pre-dispersion management apparatus. The pre-dispersion management apparatus 300 compensates for chromatic dispersion of the optical signal transmitted from the DU pool 10 and then transmits the compensated optical signal to a plurality of RUs 200 over fronthaul links. As such, the chromatic dispersion thereof is compensated for before the optical signal, output from the DU pool 10, is transmitted to each of the RUs 200, thereby removing the non-linear signal distortion factor caused by an interaction between a chirp and chromatic dispersion. Also, since the chromatic dispersion of a signal to be transmitted to several RUs is compensated for through one pre-dispersion management apparatus, such configuration is cost-effective.

Figure 3:
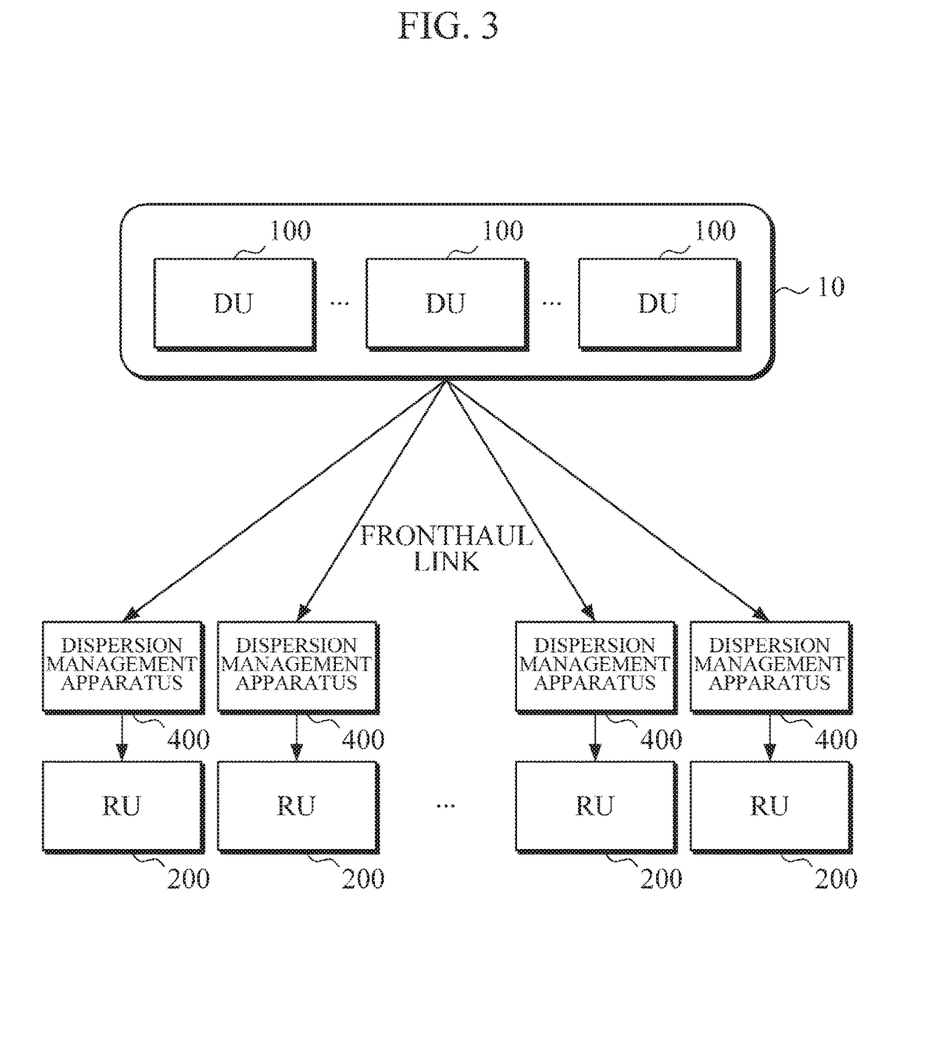
FIG. 3 is a diagram illustrating a mobile fronthaul based on a post-dispersion management apparatus according to an exemplary embodiment.

FIG. 3 is a diagram illustrating a mobile fronthaul based on a post-dispersion management apparatus according to an exemplary embodiment. In a C-RAN system, a plurality of DUs 100 is configured as one DU pool 10. Each of the DUs 100 generates and transmits an optical signal as described above, and RUs 200 receive the optical signals over mobile fronthaul links. A dispersion management apparatus 300 is the component to remove a non-linear signal distortion factor. As illustrated in FIG. 3, one dispersion management apparatus 400 is positioned before each of the RUs 200. That is, each of the plurality of dispersion management apparatuses 400 is positioned before each RU 200. This configuration is called a post-dispersion management apparatus 400. Each of the post-dispersion management apparatus 400 compensates for chromatic dispersion of optical signals transmitted over fronthaul links and then transmits the compensated optical signals to the RUs 200 corresponding one-to-one thereto. In a case of the pre-dispersion management apparatus, because lengths of the mobile fronthaul link are different from each other, the non-linear signal distortion factor may not be removed all. However, as illustrated in FIG. 3, if a mobile fronthaul is configured based on a post-dispersion management apparatus, which compensates for chromatic dispersion in a previous end of an RU, chromatic dispersion of each link may be precisely compensated for.

Figure 4:
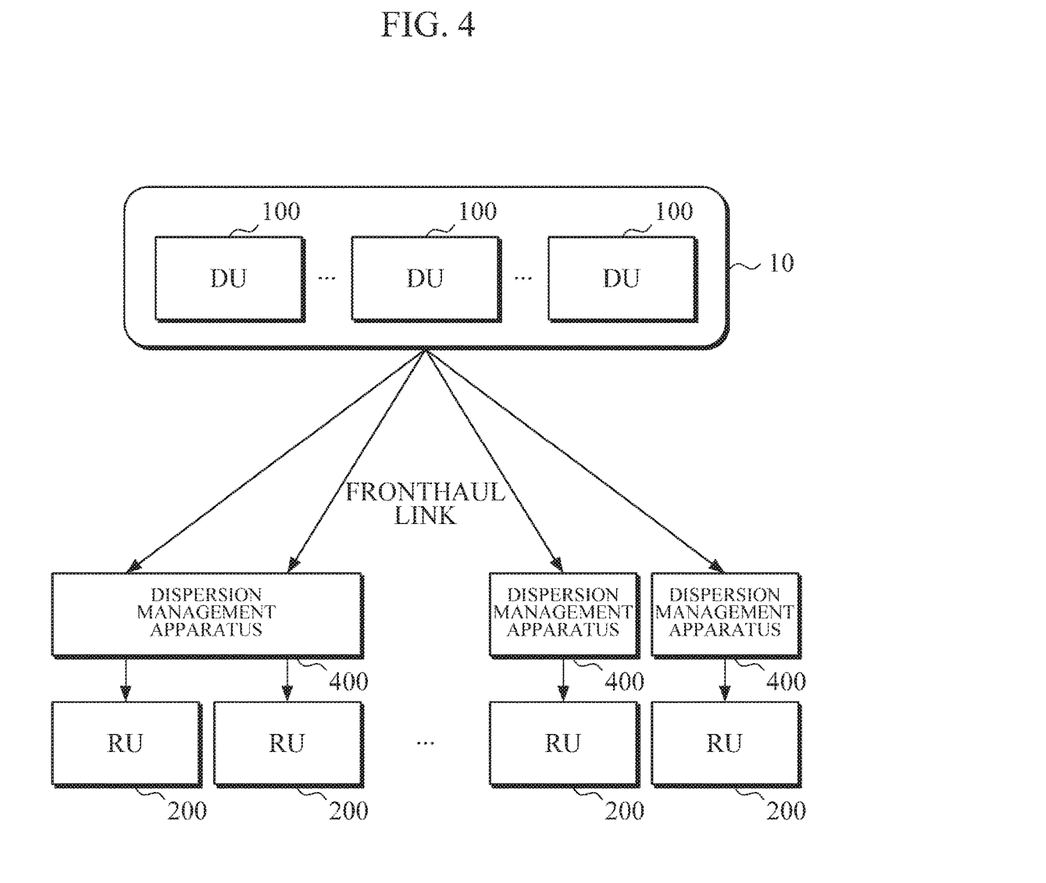
FIG. 4 is a diagram illustrating a mobile fronthaul based on a post-dispersion management apparatus according to another exemplary embodiment.

FIG. 4 is a diagram illustrating a mobile fronthaul based on a post-dispersion management apparatus according to another exemplary embodiment. In a C-RAN system, a plurality of DUs 100 is configured as one DU pool 10. Each of the DUs 100 generates and transmits an optical signal as described above, and RUs receive the optical signals over mobile fronthaul links. Post-dispersion management apparatuses 400 are the components to remove a non-linear signal distortion factor, and are positioned before one RU or two or more RUs 200. Each of the post-dispersion management apparatus 400 compensates for chromatic dispersion of optical signals transmitted over fronthaul links and then transmits the compensated optical signals to the RUs 200 corresponding one-to-one or one-to-two thereto. In one exemplary embodiment, two or more RUs 200 connected to one post-dispersion management apparatus 400 are located close to each other. That is, since the RUs positioned in a short distance have similar lengths of mobile fronthaul link to each other, one post-dispersion management apparatus 400 may compensate for chromatic dispersion thereof. Accordingly, a mobile fronthaul based on a post-dispersion management apparatus may be improved to be more cost-effective in comparison to FIG. 3.

Figure 5:
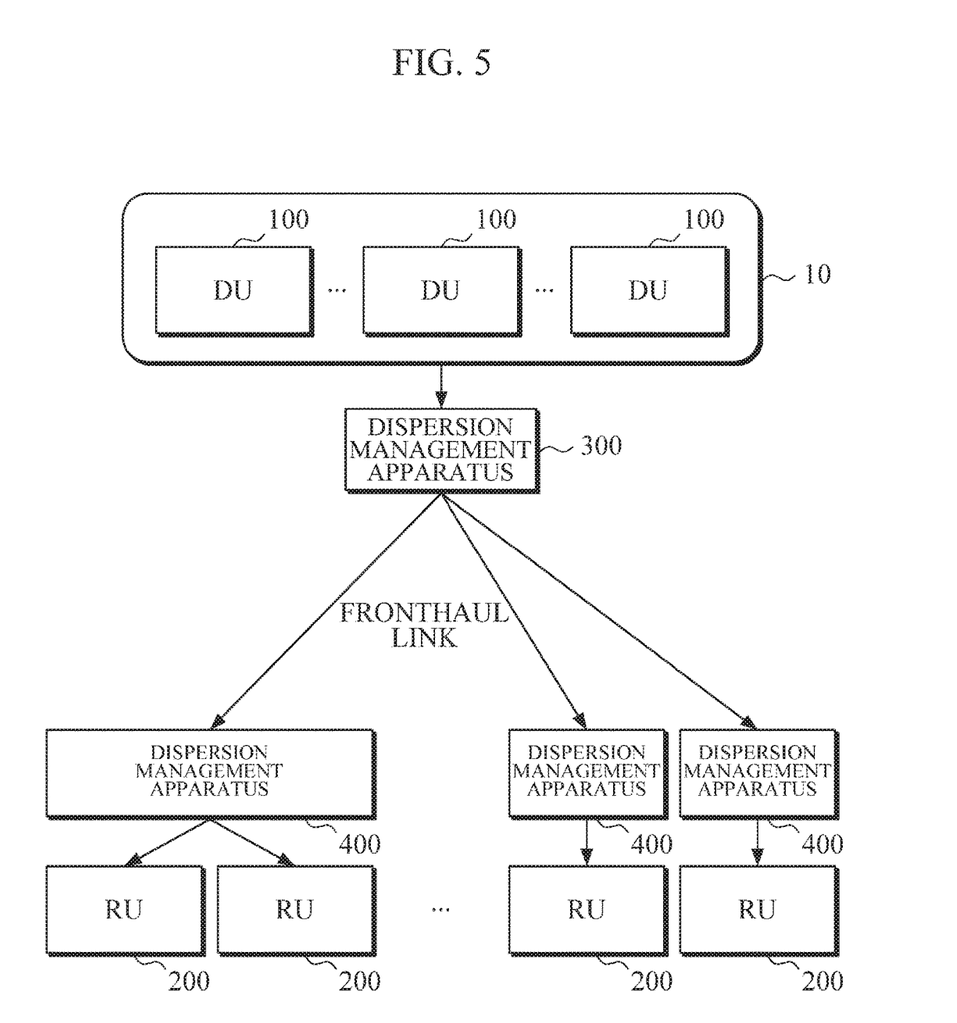
FIG. 5 is a diagram illustrating a mobile fronthaul based on a multi-level dispersion management apparatus according to an exemplary embodiment.

FIG. 5 is a diagram illustrating a mobile fronthaul based on a multi-level dispersion management apparatus according to an exemplary embodiment. In a C-RAN system, a plurality of DUs 100 is configured as one DU pool 10. Each of the DUs 100 generates and transmits an optical signal as described above, and RUs 200 receive the optical signals over mobile fronthaul links. One pre-dispersion management apparatus 300 and a plurality of post-dispersion management apparatuses 400 are all the components to remove a non-linear signal distortion factor. FIG. 5 is a combination of FIG. 2 and FIG. 4, wherein FIG. 2 is a mobile fronthaul structure based on a pre-dispersion management apparatus, and FIG. 4 is a mobile fronthaul structure based on a post-dispersion management apparatus. Since the amount of chromatic dispersion changes according to a wavelength and a transmission distance, a mobile fronthaul based on a pre-dispersion management apparatus may experience, for a specific RU, the great performance degradation caused by a non-linear signal distortion factor. In contrast, a mobile fronthaul based on a post-dispersion management apparatus uses dispersion management apparatuses for all RUs, thereby resulting in a disadvantage of increasing its implementation and maintenance expenditure.

However, a mobile fronthaul based on a multi-level dispersion management apparatus has more flexible characteristics. First dispersion compensation is performed by a pre-dispersion management apparatus 300; and for an RU that does not meet a required transmission performance due to the lack or over-compensation of chromatic dispersion, second dispersion compensation is performed by a post-dispersion management apparatus 400. In addition, if one pre-dispersion management apparatus compensates for chromatic dispersion among the RUs located close to each other, it may lead to more improvement in expenditure. As such, if a mobile fronthaul is configured based on a multi-level dispersion management apparatus, performance degradation due to a non-linear signal distortion component may be more effectively controlled in comparison to a mobile fronthaul based on a pre-dispersion management apparatus. In addition, with such configuration, the dispersion management apparatus may be more flexibly used compared to the mobile fronthaul based on the post-dispersion management apparatus, thereby having an effect of reducing its implementation expenditure.

Meanwhile, the dispersion management apparatuses 300 and 400, specifically described above, may include dispersion compensation optical fiber or a dispersion compensation module. The latter may include a tunable dispersion compensation module (TDCM). The TDCM is an element that is based on an optical fiber grid and is an optical element to maintain a predetermined dispersion value with an input signal being reflected. In one exemplary embodiment, the TDCM may perform accurate dispersion compensation for the signal of all wavelengths based on one wavelength signal among a plurality of wavelength signals that are transmitted over optical fiber. Additionally, the dispersion management apparatuses 300 and 400 may further include a fixed dispersion compensation module (FDCM), along with the TDCM. The FDCM may compensate for the dispersion of each signal for each channel that is compensated for based on one wavelength signal in the TDCM. According to one exemplary embodiment, there may be a plurality of the FDCMs to correspond to the number of channels.

The transmission performance degradation of a system may be prevented by removing a non-linear signal distortion component caused by an interaction between a laser's chirp and chromatic dispersion in a mobile fronthaul that uses IFoF-based analog optical transmission method.

While this invention has been particularly shown and described with reference to preferred embodiments thereof, it will be understood by those skilled in the art that various changes in form and details may be made therein without departing from the spirit and scope of the invention as defined by the appended claims. The preferred embodiments should be considered in descriptive sense only and not for purposes of limitation. Therefore, the scope of the invention is defined not by the detailed description of the invention but by the appended claims, and all differences within the scope will be construed as being included in the present invention.

What is claimed is:

1. An analog optical transmission system, comprising:
   a digital unit (DU) pool comprising a plurality of DUs configured to transmit an optical signal;
   a plurality of radio units (RUs) configured to receive the optical signal; and
   one or more fixed or tunable dispersion management apparatuses configured to remove a signal distortion component caused by an interaction between a chirp and chromatic dispersion by compensating for the chromatic dispersion before the plurality of RUs receives the optical signal that is transmitted from the DU pool;
   wherein there is one fixed or tunable dispersion management apparatus of the one or more fixed or tunable dispersion management apparatuses which is positioned after the DU pool and configured to compensate for the chromatic dispersion of the optical signal transmitted from the DU pool and then transmit the compensated optical signal to at least one of the plurality of RUs over fronthaul links.

2. The analog optical transmission system of claim 1, wherein the one dispersion management apparatus is one of a plurality of fixed or tunable dispersion management apparatuses, each of which is positioned before each of the plurality of RUs and configured to compensate for the chromatic dispersion of optical signals transmitted over the fronthaul links and then transmit the compensated optical signals to the plurality of RUs with one-to-one correspondence to each of the plurality of dispersion management apparatuses.

3. The analog optical transmission system of claim 1, wherein the one dispersion management apparatus is one of a plurality of fixed or tunable dispersion management apparatuses, which are positioned before one RU or two or more RUs and configured to compensate for the chromatic dispersion of optical signals transmitted over the fronthaul links and then transmit the compensated optical signals to the one RU or the two or more RUs corresponding to each of the plurality of fixed or tunable dispersion management apparatuses.

4. The analog optical transmission system of claim 3, wherein the two or more RUs corresponding to the one dispersion management apparatus are positioned in a predetermined close distance to each other.

5. The analog optical transmission system of claim 1, wherein the one dispersion management apparatus is one of a plurality of fixed or tunable dispersion management apparatuses, which comprises:
   a plurality of fixed or tunable post-dispersion management apparatuses, which are positioned before the plurality of RUs and configured to compensate for the chromatic dispersion of optical signals transmitted over the fronthaul links and then transmit the compensated optical signals to two or more of the plurality of RUs or with one-to-one correspondence with at least one of the plurality of RUs.

6. The analog optical transmission system of claim 1, wherein there are a plurality of fixed or tunable dispersion management apparatuses,
   which comprises:
   the one dispersion management apparatus operating as one fixed or tunable pre-dispersion management apparatus, which is positioned after the DU pool and configured to compensate for the chromatic dispersion of the optical signal transmitted from the DU pool and then transmit the compensated optical signal to the plurality of RUs over the fronthaul links; and
   a plurality of fixed or tunable post-dispersion management apparatuses, which are positioned before one RU or two or more RUs and configured to compensate for the chromatic dispersion of the optical signals transmitted over the fronthaul links from the one pre-dispersion management apparatus and then transmit the compensated optical signals to the one RU or the two or more RUs corresponding to each of the plurality of fixed or tunable post-dispersion management apparatuses.

7. The analog optical transmission system of claim 6, wherein the two or more RUs corresponding to the one dispersion management apparatus are positioned in a predetermined close distance to each other.

8. The analog optical transmission system of claim 1, wherein at least one of the one or more dispersion management apparatuses is a tunable dispersion compensation module (TDCM).

9. The analog optical transmission system of claim 1, wherein at least one of the one or more dispersion management apparatuses is configured to perform first compensation by using a TDCM, and second compensation by using a fixed dispersion compensation module (FDCM).

* * * * *